(12) United States Patent
Smith

(10) Patent No.: US 7,293,704 B2
(45) Date of Patent: **\*Nov. 13, 2007**

(54) KEYCARD FOR AUTOMATING TRANSACTION REQUESTS

(75) Inventor: Merrill Brooks Smith, Atlanta, GA (US)

(73) Assignee: e2Interactive, Inc., Atlanta, GA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 11/486,727

(22) Filed: Jul. 14, 2006

(65) Prior Publication Data

US 2006/0255135 A1    Nov. 16, 2006

(51) Int. Cl.
  *G06K 15/00*    (2006.01)
(52) U.S. Cl. .................. 235/383; 235/493; 235/379; 235/380; 705/1; 705/13; 705/17; 705/39
(58) Field of Classification Search ............ 235/383, 235/493, 379, 380; 705/1, 13, 17, 39
  See application file for complete search history.

(56) References Cited

U.S. PATENT DOCUMENTS

| | | | |
|---|---|---|---|
| 5,577,109 A | 11/1996 | Stimson et al. | |
| 5,918,909 A | 7/1999 | Fiala et al. | |
| 5,955,951 A * | 9/1999 | Wischerop et al. | 340/572.8 |
| 5,991,748 A | 11/1999 | Taskett | |
| 6,000,608 A | 12/1999 | Dorf | |
| 6,032,135 A | 2/2000 | Molano et al. | |
| 6,185,545 B1 | 2/2001 | Resnick et al. | |
| 6,189,787 B1 | 2/2001 | Dorf | |
| 6,202,933 B1 | 3/2001 | Poore et al. | |
| 6,208,851 B1 | 3/2001 | Hanson | |
| 6,282,566 B1 | 8/2001 | Lee, Jr. et al. | |
| 6,285,749 B1 | 9/2001 | Manto | |
| 6,314,171 B1 | 11/2001 | Dowens | |
| 6,315,206 B1 | 11/2001 | Hansen et al. | |
| 6,333,976 B2 | 12/2001 | Lesley | |
| 6,375,073 B1 | 4/2002 | Aebi et al. | |
| 6,424,706 B1 | 7/2002 | Katz et al. | |
| 6,434,379 B1 | 8/2002 | Despres et al. | |
| 6,445,780 B1 | 9/2002 | Rosset | |
| 6,473,500 B1 | 10/2002 | Risafi et al. | |
| 6,487,401 B2 | 11/2002 | Suryanarayana et al. | |
| 6,529,593 B2 | 3/2003 | Nelson | |

(Continued)

*Primary Examiner*—Michael G. Lee
*Assistant Examiner*—Allyson N Trail
(74) *Attorney, Agent, or Firm*—Hunton & Williams LLP

(57) ABSTRACT

Systems and methods of using a keycard for automating transaction requests are disclosed. Methods may comprise receiving a request for a product identification number that is associated with a product by inputting keycard information at a merchant terminal, wherein the keycard was selected from among a plurality of keycards and is associated with a specific provider and value; processing the request; transmitting a transaction confirmation; and retaining the keycard by the merchant. Systems may comprise a plurality of keycards maintained in the merchant's possession before and after automating a product request, wherein each keycard is pre-associated with a product identification number; a merchant terminal comprising an input device for inputting a product identification number from the keycard, and an output device for outputting a transaction confirmation; and a central processor configured to process a transaction request associated with the keycard and the product identification number; and deliver a transaction confirmation.

23 Claims, 5 Drawing Sheets

U.S. PATENT DOCUMENTS

| | | |
|---|---|---|
| 6,581,827 B2 | 6/2003 | Welton |
| 6,588,658 B1 | 7/2003 | Blank |
| 6,592,035 B2 | 7/2003 | Mandile |
| 6,745,022 B2 | 6/2004 | Knox |
| 6,805,289 B2 | 10/2004 | Noriega et al. |
| 6,886,742 B2 | 5/2005 | Stoutenburg et al. |
| 6,934,529 B2 | 8/2005 | Bagoren et al. |
| 6,991,157 B2 | 1/2006 | Bishop et al. |
| 7,086,584 B2 | 8/2006 | Stoutenburg et al. |
| 2001/0001321 A1 | 5/2001 | Resnick |
| 2001/0023415 A1 | 9/2001 | Keil |
| 2002/0040935 A1 | 4/2002 | Weyant |
| 2002/0119767 A1 | 8/2002 | Fieldhouse et al. |
| 2002/0169623 A1 | 11/2002 | Call et al. |
| 2003/0222135 A1 | 12/2003 | Stoutenburg et al. |
| 2004/0046035 A1 | 3/2004 | Davila et al. |
| 2004/0210449 A1 | 10/2004 | Breck et al. |
| 2004/0210476 A1 | 10/2004 | Blair et al. |
| 2004/0218741 A1 | 11/2004 | Welton |
| 2004/0260646 A1 | 12/2004 | Berardi et al. |
| 2004/0267663 A1 | 12/2004 | Karns et al. |

\* cited by examiner

KEYCARD FOR AUTOMATING TRANSACTION REQUESTS

CROSS-REFERENCE TO RELATED APPLICATIONS

This application claims priority to U.S. application Ser. No. 10/712,182 filed on Nov. 11, 2003, which claims priority on U.S. application Ser. No. 10/411,971, filed Apr. 11, 2003, which in turn claims priority to U.S. application Ser. No. 09/641,363 filed Aug. 18, 2000 now U.S. Pat. No. 6,575,361 issued Jun. 10, 2003, which in turn claims priority to U.S. Provisional Application No. 60/149,740 filed Aug. 19, 1999, all of which are incorporated herein by reference. This application also claims priority to U.S. application Ser. No. 10/253,243 filed Sep. 24, 2002, which claims priority to U.S. Provisional Application No. 60/324,333 filed Sep. 24, 2001 and U.S. Provisional Application No. 60/396,404 filed Jul. 15, 2002, all of which are incorporated herein by reference. This application is related to International Application No. PCT/US02/30281 filed Sep. 24, 2002, U.S. application Ser. No. 10/655,828 filed Sep. 5, 2003, and the application entitled "System And Method For Confirming Transaction Or Billing Communications" filed Nov. 5, 2003 all of which are incorporated herein by reference.

FIELD OF THE INVENTION

The present invention is generally related to processing transaction requests. More particularly, the present invention is related to the distribution of personal identification numbers (PINs) and/or stored-value cards between a plurality of users and a central processor over a communication network.

A customer may select a particular PIN defined by a variety of categories, such as a product type, amount, and brand name or product or service provider. A merchant may be required to specify each category of the requested PIN by making a series of successive category selections in order to process the request. In the present invention, selecting a particular keycard may replace the conventional steps of making selections within those categories during the process of requesting a stored-value card or PIN.

BACKGROUND OF THE INVENTION

Stored-value cards such as prepaid phone cards and gift cards can be purchased at merchant terminals, such as credit card terminals. In a typical stored-value card purchase transaction, the customer specifies a stored-value card request. For instance, the customer may select a particular stored-value card for purchase. The specific stored-value card is defined according to a variety of categories, such as transaction type, value, and service provider. For instance, a customer may request a new prepaid phone card from a specific provider, U.S. South, in the amount of $50. The merchant terminal requests from a central processor a PIN representing value, such as a prepaid product or service value. In order to specify this transaction request, the merchant may be required to make a series of selections at the merchant terminal, such as a credit card processing terminal. For instance, the merchant may be required to first select a type of product (such as a PIN for a prepaid phone card), a telecommunications service provider (U.S. South), and an amount of value ($50). The central processor delivers the PIN back to the merchant terminal. The merchant terminal prints the PIN on a receipt, and the receipt is provided to the customer.

The merchant terminal may comprise a screen that displays a variety of menu options, in a manner similar to the options displayed at an ATM machine. The transaction request may involve several selections across several selection screens. At one menu screen, the merchant may select "prepaid phone card" from a variety of stored-value card options such as "prepaid phone card," "prepaid gift card," and other stored-value card types. Selecting "prepaid phone card" at this menu may cause the screen to display the next category, such as transaction type.

The merchant may select a "create new card" transaction type, which may cause the screen to display another category, such as telecommunications service provider. The screen may then display a variety of telecommunications service providers, such as ABC Telecom, DEF Company, and U.S. South. Selecting a service provider may cause the screen to display a variety of values, such as $20, $30, and $50, or it may enable the merchant to input a user-specified amount at a keyboard at the terminal. The merchant may then select $50 from among the various displayed values (or the merchant may manually input a value). The menu may then pass to a screen asking whether to proceed with a transaction to request a PIN for a new stored-value card for long-distance service provided by U.S. South in the amount of $50. Other selections and inputs may be required. For instance, to "refill value" of an existing card, the terminal may require the stored-value card's existing PIN to be entered at the terminal.

The merchant would then request the terminal to proceed with the transaction request. The terminal transmits the request to a central processor. Once it receives the request, the central processor generates or selects a PIN that corresponds to the specific stored-value card request and transmit the PIN to the merchant terminal.

Prepaid phone card and other stored-value card transactions can be authorized and confirmed over communication networks. For instance, transactions involving the delivery of identification numbers (such as PINs or passwords) or other products can be authorized over communication networks between one or more remote merchant terminals and a central processor. The PINs and/or other products can be delivered over the same or another network. After a transaction, a party such as the merchant or customer can be billed for the transaction after the transaction is authorized and/or confirmed. By way of example, a convenience store merchant may sell a calling card or PIN to a customer. During the sale, the convenience store merchant requests a PIN or calling card authorization code from a central processor over a telephone network. The central station then processes the request and transmits the PIN to the store merchant over the telephone network. The store merchant receives the PIN and delivers it to the customer. Finally, the central station bills the customer or merchant for the price of the PIN.

Examples of communication networks include dedicated telephone lines, public switched telephone networks (such as those that provide automatic number identification (ANI)), the internet, any other computer network such as a WAN or LAN, and any other networked communication. The data of the stored-value cards is related to services and/or products paid or prepaid by the owner or end user of the card. Each of the stored-value cards may be associated with a PIN. Examples of prepaid services that may be accommodated by a stored-value card include long distance telephone communication, wireless communication, paging and internet-enabled communication services, including wireless web access, emergency road service, legal service, accounting service, tax service, property cleaning and/or maintenance service, clothe cleaning service, transportation service, travel service, delivery service, online (or off-line) dating service, electrical and/or gas service, water service, sewage service, internet access, and film processing (including digital film processing). Other examples of prepaid services and/or products that may be accommodated by a stored-value card include gift cards, prepaid gas cards, prepaid grocery cards, prepaid entertainment cards, prepaid movie cards, downloadable ring tone cards, downloadable game cards, downloadable movie cards, downloadable music cards that use MP3, MP4, WMV, WAV, or other music formats, any other downloadable software card, customer rewards cards, bridge and/or road toll cards, and any other type of stored-value cards for products, services, or both, that may be prepaid by the owner of the card.

BRIEF SUMMARY OF THE INVENTION

A keycard is a card that is associated with a particular stored-value card, such as a prepaid long distance telephone card. A customer or clerk selects a keycard from among a variety of keycards, each associated with a particular type of stored-value card transaction. In a preferred embodiment, the keycard can be used in the purchase of a product associated with a PIN, such as a prepaid long distance telephone card or other prepaid product.

One advantage of a keycard is that keycard information can be used to automatically specify the parameters defining a particular transaction request. For instance, scanning a keycard's barcode (or swiping a keycard's magnetic stripe) may automatically specify various stored-value card features, such as the type of stored-value card, amount of stored value, and brand.

Aspects of the invention include systems and methods of using a keycard for automating transaction requests are disclosed. The methods may comprise receiving a request for a product identification number that is associated with a product by inputting keycard information at a merchant terminal, wherein the keycard was selected from among a plurality of keycards and is associated with a specific provider and value; processing the request; transmitting a transaction confirmation; and retaining the keycard by the merchant. The systems may comprise a plurality of keycards maintained in the merchant's possession before and after automating a product request, wherein each keycard is pre-associated with a product identification number; a merchant terminal comprising an input device for inputting a product identification number from the keycard, and an output device for outputting a transaction confirmation; and a central processor configured to process a transaction request associated with the keycard and the product identification number; and deliver a transaction confirmation.

Other embodiments could be considered.

DETAILED DESCRIPTION OF THE INVENTION

Figure 1:
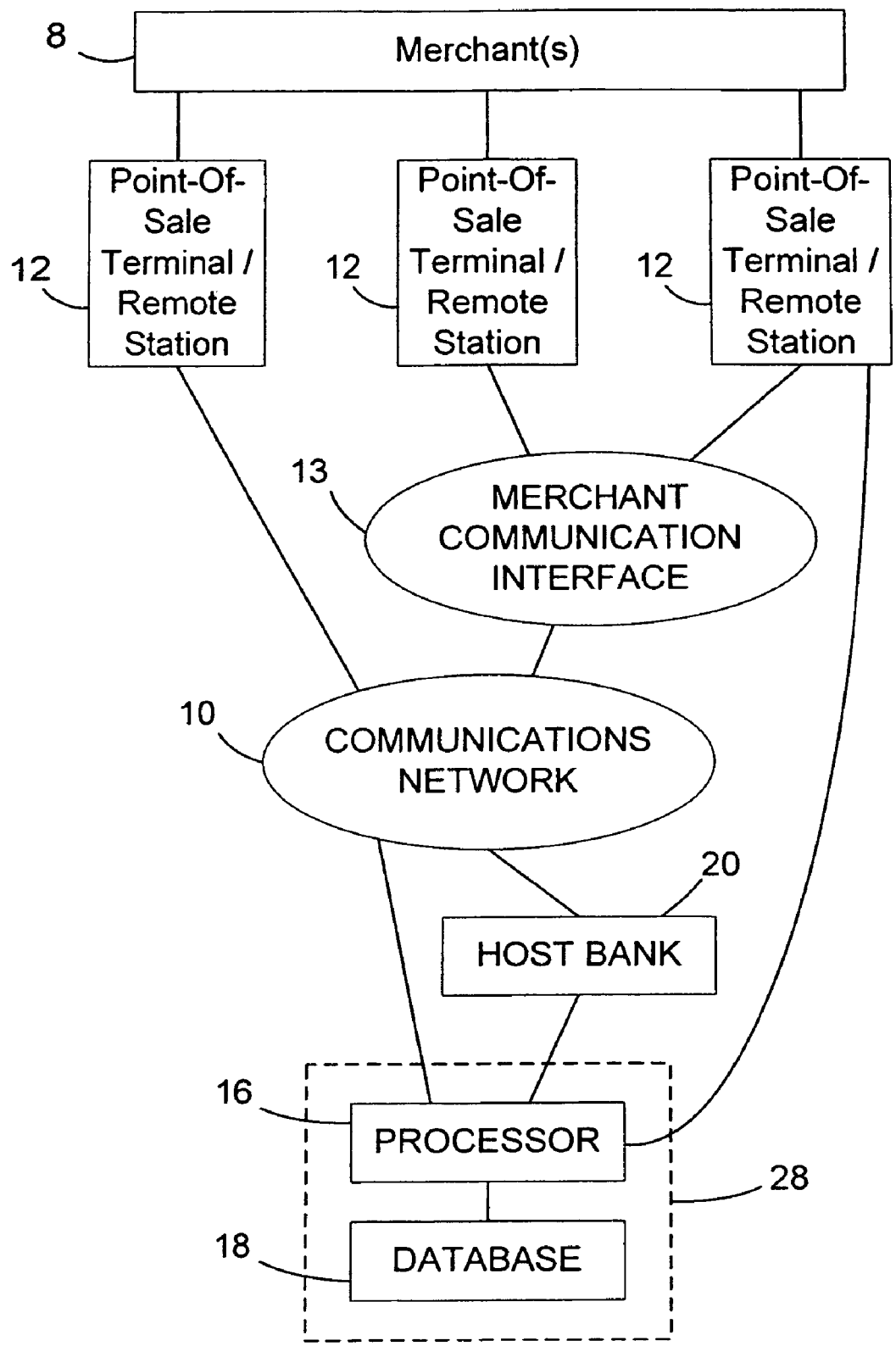
FIG. 1 illustrates a system that can use a keycard in the distribution of stored-value cards according to one embodiment of the present invention.

FIG. 1 illustrates a system that can use a keycard in the distribution of stored-value cards according to one embodiment of the present invention. The system comprises one or more merchants 8, one or more point-of-sale merchant terminals 12, a merchant communication interface 13, a communications network 10, a host bank 20, and a central processor 28 comprising a processor 16 and database 18. As shown in FIG. 1, by way of a communications network 10 and/or a point-of-sale merchant terminal 12. The communications network 10 may comprise a public switched phone network, a wireless network, a dedicated data circuit such as a dedicated phone line, a credit or debit card network, the Internet, an intranet, etc., over which credit or debit card transactions are authorized or denied. The point-of-sale merchant terminal 12 may comprise a credit or debit card terminal, is used to send a request to a stored-value card data management system 14, such as may be managed and operated by the assignee of the present invention. The terminal's 12 request may result when keycard information is input at the merchant terminal 12.

Central processor 28 may comprise a processor 16 coupled to a database 18. The central processor 28 may comprise a host computer, a computer server, a computer system with software applications that receive transactions and process them according to preset rules, and any other computer system. The database 18 may store a plurality of records comprising stored-value card data for each stored-value card issued by the assignee of the present invention. The plurality of records may also comprise keycard data for each keycard that may be used at the remote terminals 12.

A respective requesting terminal 12 may send a keycard-related request through a communications network 10 and/or a suitable host bank 20 to the central processor 28. The host bank 20 may comprise any bank or other institution that can process keycard-related requests, such as a request for a PIN enabling long distance telephone access. The keycard-related request could also be routed straight to the communications network 10 without passing through a host bank 20. FIG. 1 shows an exemplary link architecture between the communications network 10 and the central processor 28, optionally through the host bank 20. That is, the link architecture allows communication of card-related data from the merchant 8, to the communications network, which in one exemplary embodiment would be the Visa network for a Visa-routed transaction, to the host bank 20, and then to the central processor 28. It will be appreciated that other link architectures may be implemented, such as a host-to-host architectural connection. In this case, the communications network, such as a dedicated link or the internet, would be directly between a merchant's 8 "host" system and a "host" system of the assignee of the present invention. Thus, the present invention is not limited to applications that require a host bank 20 because a host-to-host connection does not require any host bank 20 or Visa network to transfer the card-related data to the central processor 28.

The keycard-related request may include information about the keycard swiped and the terminal used to swipe it, such as the electronic signature of that terminal, an IP address of the terminal, a phone number of the terminal, or a password provided by the terminal. It should be appreciated that other methods may be used to capture identification of the card besides swiping it; for instance, the information can be barcode-scanned or entered manually at a keypad of a computer. Further, merchant terminals 12 may be any system that can transmit card identifier information over a communications network. Thus, merchant terminals 12 may comprise telephones, electronic cash registers, credit card machines, fax machines, computers, or other devices that can receive and transmit information.

Figure 2:
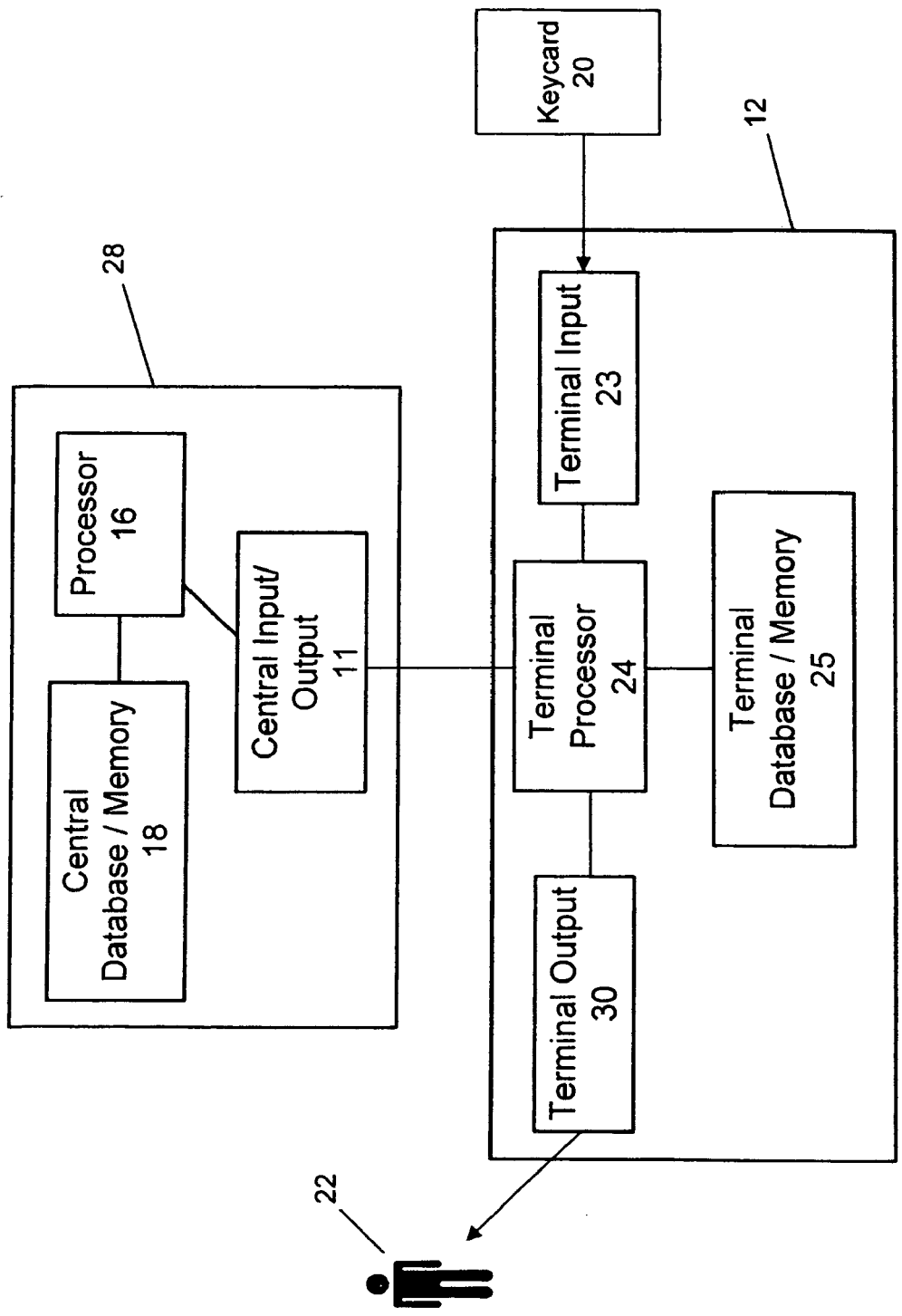
FIG. 2 illustrates a system that can use a keycard in the distribution of stored-value cards according to one embodiment of the present invention.

FIG. 2 illustrates a system that can use a keycard in the distribution of stored-value cards according to one embodiment of the present invention. The system comprises a keycard 20 and a merchant terminal 12 operatively connected to a central processor 28. The merchant terminal 12 may comprise any merchant terminal 12 used to processes transactions, such as a credit card terminal, ATM machine, computer, electronic cash register, or any other merchant terminal 12 as described above for FIG. 1. The merchant terminal 12 comprises a terminal input 23 and terminal output 30, both operatively connected to a terminal processor 24; and a terminal database/memory 26, also operatively connected to the terminal processor 24. The central processor 28 comprises a central input/output device 11 operatively connected to a processor 16, and a central database/memory 18 operatively connected to the processor 16. The central processor 28 may comprise any central server used for processing transactions received from one or more merchant terminals 12, such as a central bank computer system or server, a credit card computer system or server, an internet site, or any other suitable system 14, processor 16, or host bank 20 as described in FIG. 1.

The terminal input 23 is configured to receive keycard 20 information. The terminal input 23 may comprise a magnetic card reader, a barcode or other optical reader, a keyboard, or another input device capable of inputting keycard 20 information. The terminal input 23 is configured to pass received keycard 20 information to the terminal processor 24. The terminal processor 24 is configured to receive information from the terminal input 23, and to output information to the terminal output 30. It is also configured to pass information to (and receive information from) the terminal database/memory 26, which stores information.

The terminal processor 24 is configured to pass information, such as a transaction request and/or keycard information, to the central processor 28 at its central input/output 11. The central input/output 11 passes received information to the processor 16. The processor 16 is configured to process transaction requests, which may comprise generating a PIN based on received keycard or transaction information. The processor 16 may also select a PIN from the central database/memory 18 based on received keycard or transaction information. The generated or selected PIN and/or other transaction information is passed to the central input/output 11, which then passes the information to the merchant terminal 12 at the terminal processor 24. The other transaction information processed at the processor 16 may comprise additional information about the transaction, such as price, transaction identification information, and instructions regarding the use of the PIN or other transaction information. The instructions may comprise an identification number or password, an internet site or phone number, and any other information that may be necessary or relevant for the transaction.

The terminal processor 24 is configured to output the PIN and any other transaction information at the terminal output 30. The terminal output 30 may comprise a printer, display, or other output device. In a preferred embodiment, the terminal output 30 is configured to print a receipt for the customer showing a PIN and/or instructions for using the PIN.

Figure 3:
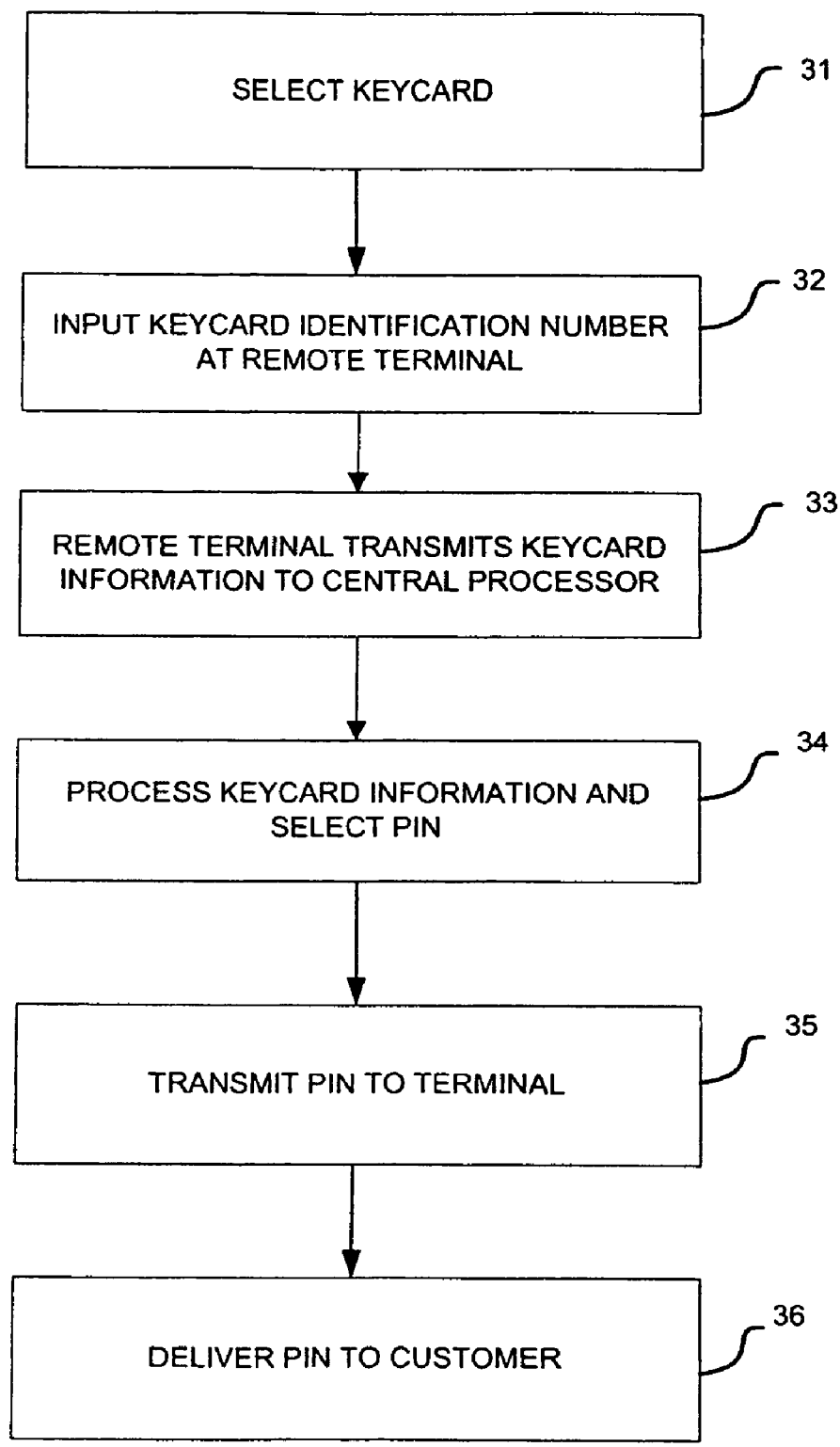
FIG. 3 illustrates a method of using a keycard to automate a product request according to one embodiment of the present invention.

FIG. 3 illustrates a method of using a keycard 20 to automate a product request according to one embodiment of the present invention.

In step 31, a keycard 20 is selected. The keycard may be any keycard 20 as described herein, such as in FIGS. 4 and 5. The keycard 20 is associated with a particular transaction. In a preferred embodiment, the associated transaction is the purchase of a PIN. A PIN may comprise any identification number, password, code, or other information associated with a particular transaction. Preferably, a PIN is an identification number used by a specific customer to access a product or service, such as wireless telephone service. The PIN may be associated with a stored-value card account.

The keycard 20 is selected in order to process the transaction associated with the keycard 20. The transaction associated with a particular keycard 20 may be defined by several variables, including transaction type, service provider, dollar amount, and/or another quantity such as an amount of time. The keycard may be selected from among a plurality of other keycards, which may be associated with different transaction types, product or service providers, amounts, and other variables.

Transaction types may comprise refilling value of existing stored-value account, redeeming value of an existing stored-value account, creating a new stored-value account, and activating a new stored-value account. For instance, one keycard 20 may be associated with a transaction wherein the customer receives a PIN enabling the customer to access $30 of prepaid wireless service provided by a particular service provider. Another keycard 20 may enable the customer to receive a PIN that enables the customer to add $20 of value to an existing account, wherein the account enables the customer to download music from a specific internet site or service.

For instance, a keycard may be selected to process a transaction relating to the purchase of a PIN that enables $30 of long distance telephone service with a particular telecommunications service provider. The keycard 20 may be associated with a particular SKU, barcode number, or other identification number. The keycard 20 may comprise a barcode printed on the card and/or a magnetic stripe storing barcode or other identification information. In a preferred embodiment, the keycard is not initially associated with a PIN.

The keycard 20 may be selected by a customer at a merchant store. For instance, a variety of keycards 20 may be displayed at a merchant store, e.g., at a counter display or aisle display, or at a display near the merchant terminal 12 which is only accessible to the merchant's employees. A customer may select one card 20 from among the variety of keycards.

The customer may then bring the keycard 20 to a merchant terminal 12 in order to process the transaction associated with the keycard 20. In another embodiment, a merchant may select a keycard 20 from among a variety of keycards, for instance at the request of a customer. The customer may request a particular keycard transaction by describing the desired transaction, and the merchant may select the appropriate keycard 20 based on the customer's request.

The keycards 20 may be located near the merchant terminal 12 in order to allow the merchant easy access to the keycards 20 when the customer requests a particular keycard 20. To facilitate quick access to the keycards 20, the keycards 20 may be attached to a ring so that the merchant can flip through the keycards 20 and quickly select the desired keycard. The keycards 20 may be color-coded to further facilitate quick selection and avoid confusion. For instance, one keycard 20 associated with a particular type of PIN may be colored bright red, so that the merchant or customer may quickly find and select the keycard 20 by searching for a red-colored keycard 20. Alternately, all keycards 20 associated with a particular service provider may have a particular color, style, size, or texture to enable easy identification from among the other keycards and/or other merchant products.

Alternately, the customer may select a particular "dummy keycard" from among a variety of "dummy keycards" displayed at the merchant store, wherein each dummy card is associated with a particular keycard. For instance, a keycard used for requesting a $50 long distance PIN may have a nearly identical dummy card on display. However, the "real" keycard 20 can be used to process a transaction, e.g., by scanning its barcode, whereas the dummy card will identify the appropriate transaction but will not otherwise have the necessary elements to trigger the transaction at the merchant terminal 12, such as barcode information or the information stored on a magnetic strip. The customer could select a dummy card and present it to the merchant at the merchant terminal 12. The merchant would then select a "real" keycard 20 associated with the dummy card and begin to process the transaction.

Using a "dummy" keycard has several advantages. First, dummy cards may be lost or stolen with little or no harmful effect to the merchant or issuer of stored-value card accounts. The "real" keycards 20 are kept secure in the possession of the merchant, e.g., "behind the counter". The "real" cards may be used over and over again, as they might never be passed to the customer, and the merchant may keep them after each transaction. The dummy cards may be less expensive to produce since they do not require a barcode or magnetic strip. The dummy cards may be re-usable; e.g., after a customer brings a dummy card to the merchant or merchant terminal 12, the dummy card may be retained by the merchant and restocked in the merchant store. In another embodiment, the dummy card can be used for the receipt, and the merchant terminal 12 may print the PIN or other information on the dummy card. In this case, the customer may keep the dummy card at the end of the transaction, as described below in step 36.

Using dummy cards may also save time for the merchant. The customer selects the keycard 20 before approaching the merchant, rather than after. Finally, the use of a dummy card can prevent errors due to miscommunication. When customers and merchants often do not speak the same language, the use of a dummy card can facilitate a transaction by signaling the customer's choice without requiring the customer to otherwise communicate the selection. The merchant can merely look at the dummy keycard and use the associated "real" keycard 20 to process the transaction.

The dummy cards may be colored and designed similar to their associated keycard 20. In this way, a customer may select a particular dummy keycard, and the merchant can quickly find the appropriate keycard 20 by searching for a keycard that looks like the dummy card. This has an added advantage of overcoming communication barriers and confusion, as the customer and merchant do not need to communicate verbally provided that the merchant can see the dummy keycard selected by the customer.

In step 32, keycard 20 identification information is input at the merchant terminal 12. In a preferred embodiment, keycards 20 comprising a magnetic strip and/or barcode may be swiped at merchant terminals 12 equipped to read magnetic strips and/or barcodes. If the keycard 20 has a printed identification number, the number may be entered manually at the terminal, for instance at a terminal keypad.

In step 33, the merchant terminal 12 transmits the keycard information to a central processor 28. The central processor 28 may be any central processor 28 as described herein. The information may be transmitted over the internet, over a public switched telephone network (e.g., via modem), on a dedicated data line, or on another communication network 10.

In step 34, the central processor 28 processes the keycard information and selects a PIN. In a preferred embodiment, the keycard is not associated with a PIN prior to this step. The central processor 28 may process the keycard information in order to determine the appropriate transaction or PIN type. In one example, the merchant terminal swipes the magnetic strip or scans the barcode of a keycard 20 associated with a particular transaction, as described above in step 32. The merchant terminal transmits the keycard identification information to the central processor 28 in step 33. The central processor 28 receives the keycard information and determines the transaction request associated with the keycard information. For instance, if the keycard 20 is associated with a new PIN for $30 of wireless telephone service from US South Communications, then the central processor will read the received keycard information and determine that it refers to a new PIN for $30 of wireless telephone service provided by US South Communications. Based on this determination, it will select a PIN associated with the transaction request. In this example, the central processor would select a PIN associated with $30 of wireless telephone service provided by US South Communications.

In step 35, the central processor transmits the PIN and/or other transaction information to the merchant terminal. The medium of communication may be any communication network.

In step 36, the merchant terminal delivers the PIN and/or other transaction information to the customer. For instance, the merchant terminal may display the PIN and/or other information to the customer on a screen. It also may print the PIN and/or other information at a printer at the merchant terminal. In a preferred embodiment, the merchant terminal prints a PIN on a receipt provided to the customer at the end of the transaction. The receipt may comprise a dummy card. The customer may later use the PIN in one or more of the ways discussed above, such as by activating and using an amount of long distance calling time or downloading music from an internet site.

Figure 4:
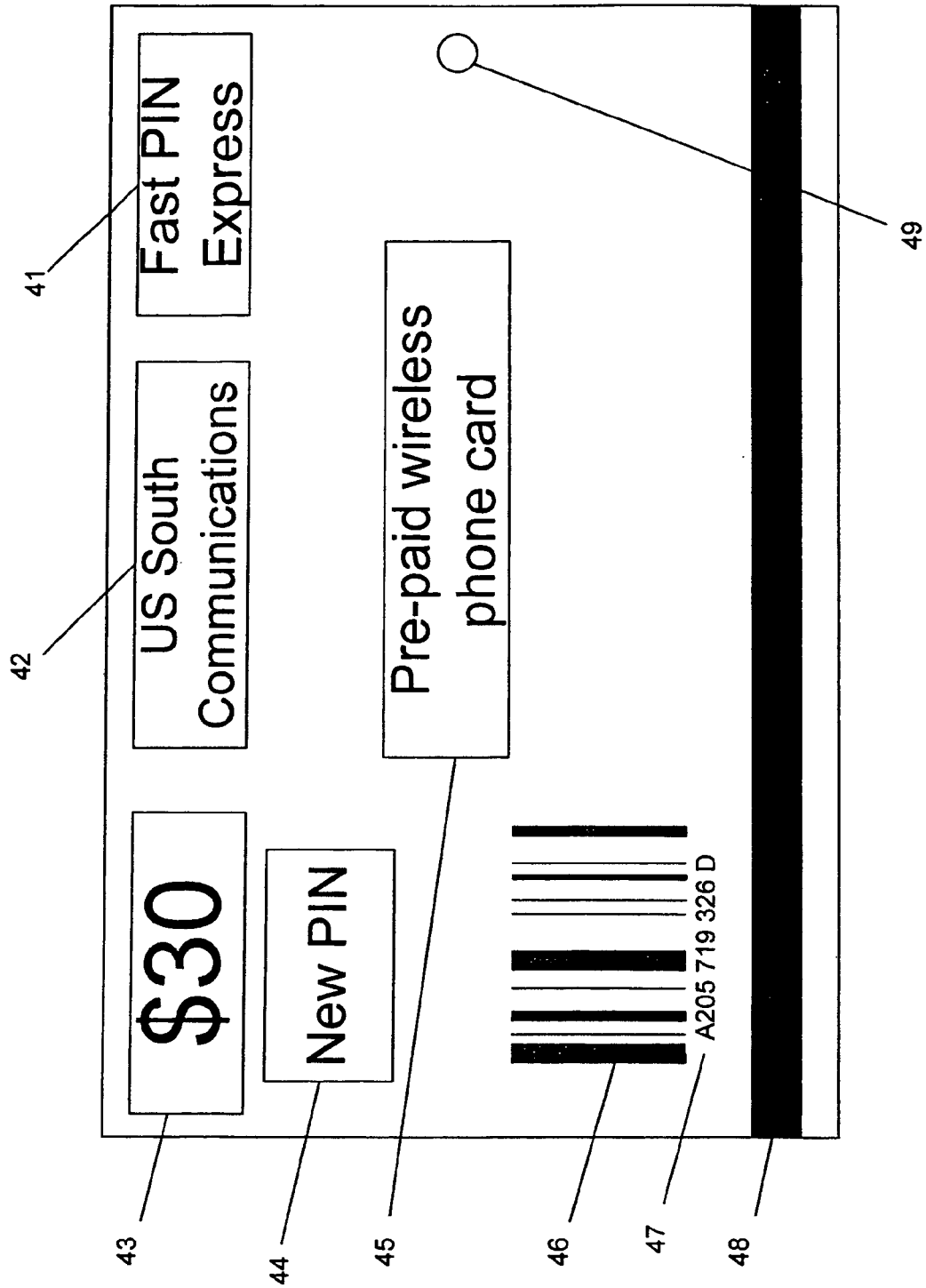
FIG. 4 illustrates the front side of a keycard according to one embodiment of the present invention.

FIG. 4 illustrates the front side of a keycard 20 according to one embodiment of the present invention. The front side of the keycard 20 may comprise a keycard title 41, a brand (or carrier) 42, a value 43, a transaction type 44, a product type 45, a bar code 46, a bar code identifier 47, a magnetic strip 48, and a hole 49 for attaching multiple keycards 20. The keycard 20 may be any size and may be comprised of any material. Preferably, the keycard 20 comprises plastic and has a size similar to that of a credit card or small envelope.

Any information related to the keycard 20 or the associated transaction may be displayed on either side of the keycard 20. For instance, items shown in FIG. 4 on the front side may instead (or in addition) be on the back of the card, and vice versa.

Figure 5:
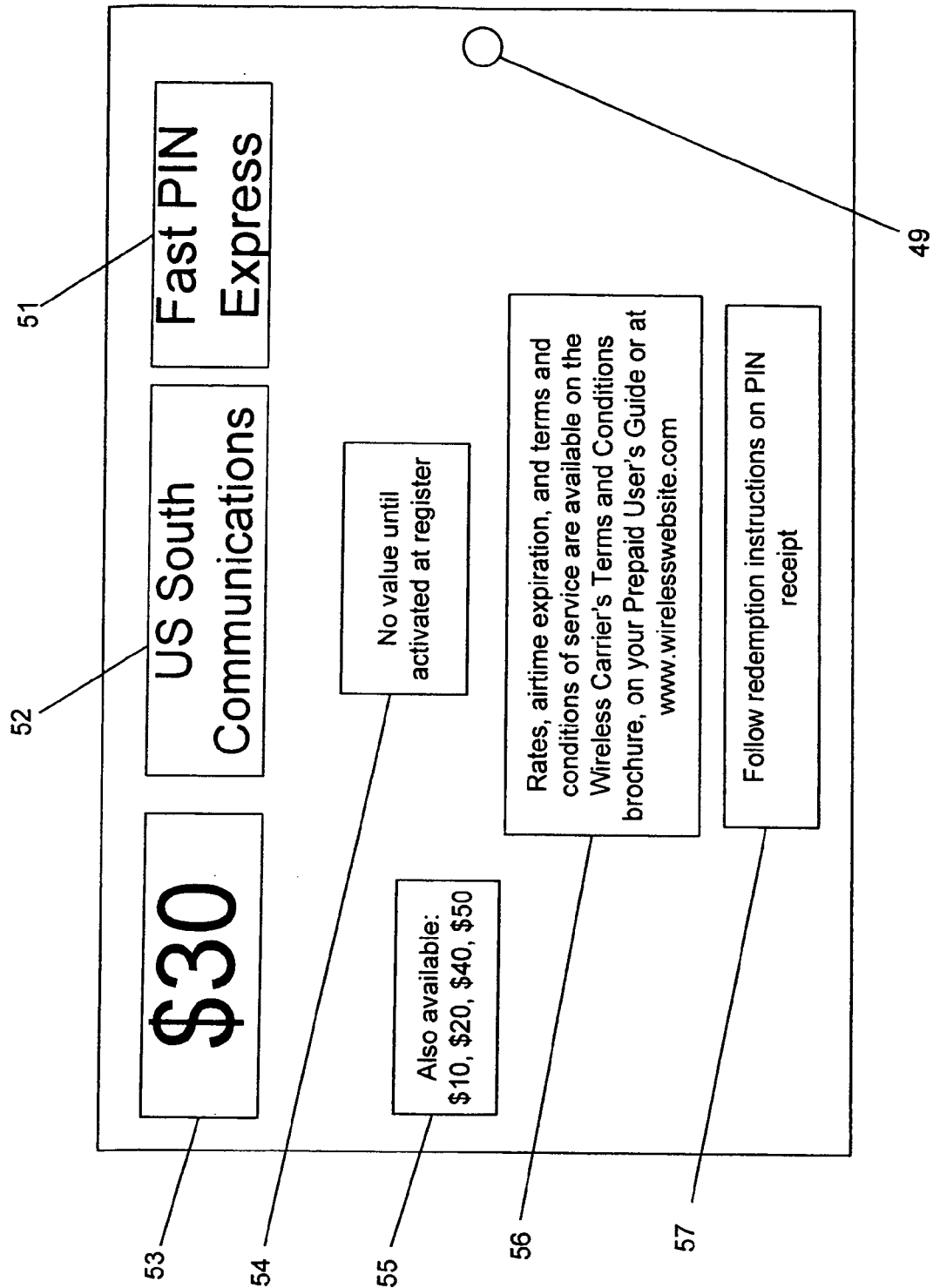
FIG. 5 illustrates the back side of a keycard according to one embodiment of the present invention.

FIG. 5 illustrates the back side of a keycard 20 according to one embodiment of the present invention. The back side of the keycard 20 may comprise a keycard title 51, a brand (such as a carrier or service provider) 52, a value 53, information about the keycard 20, transaction, or PIN 54-57, and a hole 58 for attaching multiple keycards 20. Information about the keycard 20 may comprise: disclaimer information 54 such as "no value until activated at register;" advertising 55, such as a description of other products available in the store or with a particular brand; descriptions of sources of additional information 56, such as a message indicating a website that describes further information about the keycard 20 or a keycard transaction; and instructions to the customer or merchant 57, such as an instruction to follow the directions on the PIN receipt. The hole 49 on the front side is also visible on the back side.

It will be understood that the specific embodiment of the invention shown and described herein is exemplary only. Numerous variations, changes, substitutions and equivalents will now occur to those skilled in the art without departing from the spirit and scope of the present invention. For instance, any of the communications described above, such as delivering a PIN, may be encrypted communications, and the central processor and remote terminal may use any encryption and decryption apparatus and techniques in the art. In particular, the terms used in this application should be read broadly in light of the similar terms used in the related applications. For instance, the point-of-sale terminals 12 may be any kind of terminal as disclosed in the related applications, and the processor may be any kind of processor as disclosed in the related applications. Accordingly, it is intended that all subject matter described herein and shown in the accompanying drawings be regarded as illustrative only and not in a limiting sense and that the scope of the invention be solely determined by the appended claims.

What is claimed is:

1. A method for automating a product request, the method comprising:
    receiving at a central processor a request for a product identification number associated with a purchasable product prior to the receiving action, wherein the request is received from a merchant terminal and the request is generated by inputting keycard information at the merchant terminal of a merchant, wherein the keycard is selected from among a plurality of keycards, wherein each keycard is associated with a specific provider and a specific value;
    processing at the central processor the request;
    transmitting from the central processor to the merchant terminal a transaction confirmation associated with the keycard to the merchant terminal;
    retaining the keycard by the merchant after the transmitting step; and
    delivering the product identification number to the customer.

2. The method of claim 1 wherein the transaction confirmation comprises a product identification number (PIN) or password.

3. The method of claim 2, wherein the transaction confirmation is associated with a prepaid calling card.

4. The method of claim 3, wherein the keycard is associated with a specific telecommunications service provider.

5. The method of claim 2, wherein the keycard comprises a barcode on the keycard, and the request is associated with the barcode.

6. The method of claim 2, wherein the request comprises a product identification number associated with a barcode, the barcode is printed on the keycard, and the step of inputting comprises scanning the barcode.

7. The method of claim 2, wherein the product information number is stored on a magnetic strip, and inputting the keycard information comprises swiping the magnetic strip.

8. The method of claim 2 wherein the transaction confirmation comprises instructions for using a PIN associated with a stored-value account, and the PIN is associated with the keycard information.

9. The method of claim 1, wherein the keycard information is associated with at least one of a stored-value card and a PIN.

10. The method of claim 9, wherein the at least one of a stored-value card and a PIN is associated with a gift card.

11. The method of claim 9, wherein the at least one of a stored-value card and a PIN is associated with a prepaid gas card.

12. The method of claim 9, wherein the at least one of a stored-value card and a PIN is associated with a prepaid grocery card.

13. The method of claim 9, wherein the at least one of a stored-value card and a PIN is associated with a prepaid entertainment card.

14. The method of claim 9, wherein the at least one of a stored-value card and a PIN is associated with a downloadable game card.

15. The method of claim 9, wherein the at least one of a stored-value card and a PIN is associated with a downloadable music card.

16. The method of claim 9, wherein the at least one of a stored-value card and a PIN is associated with a downloadable music card that uses MP3, MP4, WMV, or WAV formats.

17. The method of claim 9, wherein the at least one of a stored-value card and a PIN is associated with a customer rewards card.

18. The method of claim 9, wherein the at least one of a stored-value card and a PIN is associated with telecommunications service.

19. A system for automating a product request, comprising:
    a plurality of keycards maintained in the possession of a merchant before and after automating a product request, wherein each keycard is pre-associated with a product identification number;
    a merchant terminal comprising an input device for inputting a product identification number from the keycard, and further comprising an output device for outputting a transaction confirmation associated with a product identification number, the output device configured to deliver a product identification number to a customer; and
    a central processor configured to:
        process a transaction request associated with a keycard and the product identification number associated with the keycard, wherein the request is received from the merchant terminal; and
        deliver a transaction confirmation associated with the keycard to the merchant terminal.

20. The system of claim 19 wherein the transaction confirmation comprises a product identification number (PIN).

21. The system of claim 19 wherein the transaction confirmation is associated with a request to change the value of a stored-value account.

22. The method of claim 21, wherein the at least one of a stored-value card and a PIN is associated with a downloadable ring tone card.

23. The system of claim 19 wherein the transaction confirmation comprises instructions for using a PIN associated with a stored-value account, and the PIN is associated with the product identification number, and wherein the keycard is associated with a product or service provider and a value.

* * * * *

UNITED STATES PATENT AND TRADEMARK OFFICE
CERTIFICATE OF CORRECTION

| | | |
|---|---|---|
| PATENT NO. | : 7,293,704 B2 | Page 1 of 1 |
| APPLICATION NO. | : 11/486727 | |
| DATED | : November 13, 2007 | |
| INVENTOR(S) | : Merrill Brooks Smith | |

It is certified that error appears in the above-identified patent and that said Letters Patent is hereby corrected as shown below:

Title page, item (63) and (60) should read as follows

"(63) Continuation of application No. 10/712,182, filed on Nov. 11, 2003, now Pat. No. 7,168,615, which is a continuation-in-part of application No. 10/411,971, filed on Apr. 11, 2003, now Pat. No. 7,083,084, which is a continuation of application No. 09/641,363, filed on Aug. 18, 2000, now Pat. No. 6,575,361. Application No. 10/712,182 is also a continuation-in-part of application No. 10/253,243, filed on September 24, 2002, now Pat. No. 7,333,955

(60) Provisional application No. 60/149,740, filed on Aug. 19, 1999, provisional application no. 60/324,333, filed on Sep. 24, 2001, provisional application no. 60/396,404, filed on July 15, 2002."

Signed and Sealed this

Thirty-first Day of August, 2010

David J. Kappos
*Director of the United States Patent and Trademark Office*